(12) United States Patent
Oshima et al.

(10) Patent No.: US 8,124,704 B2
(45) Date of Patent: Feb. 28, 2012

(54) CONJUGATED DIENE POLYMER, CONJUGATED DIENE POLYMER COMPOSITION, AND PROCESS FOR PRODUCING CONJUGATED DIENE POLYMER

(75) Inventors: Mayumi Oshima, Kanagawa (JP); Toru Fujii, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 248 days.

(21) Appl. No.: 12/409,557

(22) Filed: Mar. 24, 2009

(65) Prior Publication Data

US 2009/0247692 A1  Oct. 1, 2009

(30) Foreign Application Priority Data

Mar. 31, 2008 (JP) ................................. 2008-090696
Aug. 27, 2008 (JP) ................................. 2008-217832

(51) Int. Cl.
  *C08F 30/08* (2006.01)
  *C08F 12/28* (2006.01)
  *C08F 36/00* (2006.01)
  *C08F 220/56* (2006.01)
  *C08F 4/00* (2006.01)

(52) U.S. Cl. ........ 526/279; 526/310; 526/335; 524/547; 525/271

(58) Field of Classification Search .................. 524/547; 526/279, 310, 335; 525/271
See application file for complete search history.

(56) References Cited

FOREIGN PATENT DOCUMENTS

| EP | 0 341 496 | * 11/1989 |
|---|---|---|
| EP | 0341496 A2 | 11/1989 |
| EP | 0493364 A2 | 7/1992 |
| JP | 63-186748 A | 8/1988 |
| JP | 1-217047 A | 8/1989 |
| JP | 1-217048 A | 8/1989 |
| JP | 2005-290355 A | 10/2005 |
| WO | 2008/108377 A1 | 9/2008 |

* cited by examiner

*Primary Examiner* — William Cheung
(74) *Attorney, Agent, or Firm* — Sughrue Mion, PLLC

(57) ABSTRACT

A conjugated diene polymer is provided that includes a conjugated diene-based constituent unit and a group represented by Formula (I) below at both termini of a polymer chain.

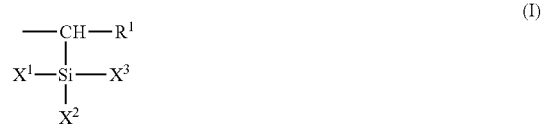

There are also provided a conjugated diene polymer composition formed by combining the conjugated diene polymer and a filler, a process for producing the conjugated diene polymer, a process for producing the conjugated diene polymer composition, a vulcanizate, and a process for producing the vulcanizate.

17 Claims, No Drawings

CONJUGATED DIENE POLYMER, CONJUGATED DIENE POLYMER COMPOSITION, AND PROCESS FOR PRODUCING CONJUGATED DIENE POLYMER

TECHNICAL FIELD

The present invention relates to a conjugated diene polymer, a conjugated diene polymer composition, and a process for producing a conjugated diene polymer.

BACKGROUND ART

In recent years, with the growing concern over environmental problems the demand for good fuel economy for automobiles has been becoming stronger, and there is also a demand for excellent fuel economy for polymer compositions used for automobile tires. As a polymer composition for automobile tires, a polymer composition comprising a conjugated diene polymer such as polybutadiene or a butadiene-styrene copolymer and a filler such as carbon black, etc. is used and, for example, a polymer composition containing as the conjugated diene polymer a polymer formed by modifying with a dialkylamino group-containing acrylamide one terminal of a polymer formed by copolymerizing butadiene and styrene using an alkyllithium as a polymerization initiator (see e.g. JP-A-1-217047, U.S. Pat. No. 5,189,109) is known. Furthermore, a polymer composition containing as the conjugated diene polymer a polymer formed by modifying with bis(dimethylamino)methylvinylsilane one terminal of a polymer formed by copolymerizing butadiene and styrene using an alkyllithium as a polymerization initiator (see e.g. JP-A-1-217048, U.S. Pat. No. 5,189,109), a polymer composition containing as the conjugated diene polymer a polymer formed by modifying with a dialkylamino group-containing alkoxysilane one terminal of a polymer formed by polymerizing butadiene or copolymerizing butadiene and styrene, using an alkyllithium as a polymerization initiator (see e.g. JP-A-63-186748, U.S. Pat. No. 4,957,976 and JP-A-2005-290355, US2005-203251A1), etc. have been proposed as polymer compositions having good fuel economy.

DISCLOSURE OF THE INVENTION

However, the above-mentioned conventional polymer compositions comprising a conjugated diene polymer are not always satisfactory in terms of the balance between fuel economy and abrasion resistance, particularly when a filler such as silica is used.

Under such circumstances, an object of the present invention is to provide a conjugated diene polymer that can give a polymer composition having excellent fuel economy and abrasion resistance when mixed with a filler such as silica, a polymer composition formed by mixing the conjugated diene polymer and a filler such as silica, and a process for producing the conjugated diene polymer.

The present invention provides a conjugated diene polymer comprising a conjugated diene-based constituent unit and a group represented by Formula (I) at both termini of a polymer chain.

In the formula, $R^1$ denotes a hydrogen atom, a hydrocarbyl group having 1 to 20 carbons, or a substituted hydrocarbyl group having 1 to 20 carbons, $X^1$, $X^2$, and $X^3$ independently denote a group represented by Formula (II), a hydroxy group, a hydrocarbyl group, or a substituted hydrocarbyl group, and at least one selected from among $X^1$, $X^2$, and $X^3$ is a group represented by Formula (II) or a hydroxy group.

In the formula, $R^2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure.

The present invention provides a conjugated diene polymer composition comprising the conjugated diene polymer, and a filler.

Furthermore, the present invention provides a process for producing a conjugated diene polymer, comprising the steps of A, B, and C.

(Step A) contacting an organoalkali metal compound catalyst having 2 to 20 carbons and a silicon compound represented by Formula (III) in a hydrocarbon solvent to prepare a reaction product of the organoalkali metal compound catalyst and the silicon compound;

(Step B) polymerizing a monomer comprising a conjugated diene by contacting the monomer with the reaction product prepared in Step A and the monomer comprising a conjugated diene in a hydrocarbon solvent to prepare a polymer having at a polymer chain terminal an alkali metal originating from the organoalkali metal compound catalyst; and (Step C) reacting a silicon compound represented by Formula (III) with a polymer chain terminal, of the polymer prepared in Step B, having the alkali metal originating from the organoalkali metal compound catalyst by contacting the silicon compound represented by Formula (III) with the polymer in a hydrocarbon solvent

wherein $X^4$, $X^5$, and $X^6$ independently denote a group represented by Formula (II), a hydrocarbyl group, or a substituted hydrocarbyl group, and at least one selected from among $X^4$, $X^5$, and $X^6$ is a group represented by Formula (II),

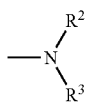
(II)

wherein $R^2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure.

MODE FOR CARRYING OUT THE INVENTION

The conjugated diene polymer of the present invention is a polymer comprising a conjugated diene-based constituent unit and a group represented by Formula (I) at both termini of a polymer chain.

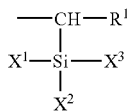
(I)

In the formula, $R^1$ denotes a hydrogen atom, a hydrocarbyl group having 1 to 20 carbons, or a substituted hydrocarbyl group having 1 to 20 carbons, $X^1$, $X^2$, and $X^3$ independently denote a group represented by Formula (II), a hydroxy group, a hydrocarbyl group, or a substituted hydrocarbyl group, and at least one selected from among $X^1$, $X^2$, and $X^3$ is a group represented by Formula (II) or a hydroxy group.

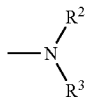
(II)

In the formula, $R^2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure.

In the present specification, the hydrocarbyl group denotes a hydrocarbon residue. The substituted hydrocarbyl group denotes a group in which at least one hydrogen atom of the hydrocarbon residue is substituted by a substituent. The substituted silyl group denotes a group in which at least one hydrogen atom of a silyl group is substituted by a substituent.

Examples of the conjugated diene-based constituent unit include 1,3-butadiene, isoprene, 1,3-pentadiene, 2,3-dimethyl-1,3-butadiene, and 1,3-hexadiene. From the viewpoint of ready availability, 1,3-butadiene and isoprene are preferable. Each of these may be used alone or in combination with another or more.

$R^1$ in Formula (I) denotes a hydrogen atom, a hydrocarbyl group having 1 to 20 carbons, or a substituted hydrocarbyl group having 1 to 20 carbons.

Examples of the hydrocarbyl group having 1 to 20 carbons denoted by $R^1$ include an n-propyl group, an n-butyl group, a sec-butyl group, an n-pentyl group, a neopentyl group, an isopentyl group, a benzyl group, a 5-phenylpentyl group, and a cyclohexylmethyl group.

Examples of the substituted hydrocarbyl group having 1 to 20 carbons denoted by $R^1$ include a dimethylaminobutyl group, a diethylaminobutyl group, a t-butyldimethylsilyloxybutyl group, an N-morpholinobutyl group, a pyrrolidinylmethyl group, and a piperidinylmethyl group. As the substituted hydrocarbyl group, a substituted hydrocarbyl group comprising as a substituent a group selected from the group consisting of a nitrogen-containing group, an oxygen-containing group, and a silicon-containing group is preferable.

$X^1$, $X^2$, and $X^3$ of Formula (I) independently denote a group represented by Formula (II), a hydroxy group, a hydrocarbyl group, or a substituted hydrocarbyl group, and at least one selected from among $X^1$, $X^2$, and $X^3$ is a group represented by Formula (II) or a hydroxy group.

(II)

In the formula, $R^2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure.

Examples of $R^2$ and $R^3$ include alkyl groups such as a methyl group, an ethyl group, an n-propyl group, an isopropyl group, an n-butyl group, a sec-butyl group, a tert-butyl group, an n-pentyl group, a neopentyl group, an isopentyl group, and an n-hexyl group; a cyclohexyl group; a phenyl group; alkoxyalkyl groups such as a methoxymethyl group; a methoxyethyl group, an ethoxymethyl group, and an ethoxyethyl group; and trialkylsilyl groups such as a trimethylsilyl group and a t-butyldimethylsilyl group.

Examples of groups in which $R^2$ and $R^3$ are bonded include alkylene groups such as a trimethylene group, a tetramethylene group, a pentamethylene group, and a hexamethylene group; oxydialkylene groups such as an oxydiethylene group and an oxydipropylene group; and nitrogen-containing groups such as a group represented by —$CH_2CH_2$—NH—$CH_2$— and a group represented by —$CH_2CH_2$—N=CH—.

The hydrocarbyl group denoted by $R^2$ and $R^3$ is preferably an alkyl group, the substituted hydrocarbyl group denoted by $R^2$ and $R^3$ is preferably an alkoxyalkyl group, and the substituted silyl group is preferably a trialkylsilyl group.

$R^2$ and $R^3$ are preferably a substituted hydrocarbyl group having 1 to 6 carbons in which the substituent is a group selected from the group consisting of a nitrogen-containing group, an oxygen-containing group, and a silicon-containing group, a hydrocarbyl group having 1 to 6 carbons, or a substituted silyl group, are more preferably a substituted hydrocarbyl group having 1 to 4 carbons in which the substituent is a group selected from the group consisting of a nitrogen-containing group, an oxygen-containing group, and a silicon-containing group, a hydrocarbyl group having 1 to 4 carbons, or a substituted silyl group, are yet more preferably a methyl group, an ethyl group, an n-propyl group, an n-butyl group, a trimethylsilyl group, a group represented by —$CH_2CH_2$—NH—$CH_2$—, or a group represented by —$CH_2CH_2$—N=CH—, are particularly preferably a methyl group, an ethyl group, an n-propyl group, or an n-butyl group, and are most preferably an ethyl group or an n-butyl group.

The group represented by Formula (II) is, for example, an acyclic amino group or a cyclic amino group. Examples of the acyclic amino group include a dialkylamino group, a di(alkoxyalkyl)amino group, a di(trialkylsilyl)amino group, etc. Examples thereof include a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, an ethylmethylamino group, a di(methoxymethyl)amino group, a di(methoxyethyl)amino group, a di(ethoxymethyl)amino group, a di(ethoxyethyl)amino group, a di(trimethylsilyl)amino group, and a di(t-butyldimethylsilyl)amino group.

Examples of the cyclic amino group include 1-polymethyleneimino groups such as a 1-pyrrolidinyl group, a piperidino group, a 1-hexamethyleneimino group, a 1-heptamethyleneimino group, a 1-octamethyleneimino group, a 1-decamethyleneimino group, a 1-dodecamethyleneimino group, a 1-tetradecamethyleneimino group, and a 1-octadecamethyleneimino group. Further examples of the cyclic amino group include a 1-imidazolyl group, a 4,5-dihydro-1-imidazolyl group, a 1-imidazolidinyl group, a 1-piperazinyl group, and a morpholino group.

From the viewpoint of economy and ready availability, the group represented by Formula (II) is preferably an acyclic amino group, more preferably a dialkylamino group, and further preferably a dimethylamino group, a diethylamino group, a di(n-propyl)amino group, or a di(n-butyl)amino group. Among them, from the viewpoint of ready availability of the compound, a diethylamino group or a di(n-butyl)amino group is preferable.

Examples of the hydrocarbyl group denoted by $X^1$, $X^2$, and $X^3$ in Formula (I) include alkyl groups such as a methyl group, an ethyl group, an n-propyl group, an isopropyl group, an n-butyl group, a sec-butyl group, and a tert-butyl group. Furthermore, examples of the substituted hydrocarbyl group include alkoxyalkyl groups such as a methoxymethyl group, an ethoxymethyl group, a methoxyethyl group, and an ethoxyethyl group. The hydrocarbyl group is preferably an alkyl group, and the substituted hydrocarbyl group is preferably an alkoxyalkyl group.

The hydrocarbyl group and substituted hydrocarbyl group denoted by $X^1$, $X^2$, and $X^3$ are preferably a hydrocarbyl group having 1 to 4 carbons or a substituted hydrocarbyl group having 1 to 4 carbons, and more preferably a methyl group or an ethyl group.

At least one selected from among $X^1$, $X^2$, and $X^3$ in Formula (I) is a group represented by Formula (II) or a hydroxy group. It is preferable that at least two selected from among $X^1$, $X^2$, and $X^3$ are a group represented by Formula (II) or a hydroxy group, and it is more preferable that two selected from among $X^1$, $X^2$, and $X^3$ are a group represented by Formula (II) or a hydroxy group.

The conjugated diene polymer may further comprise, in addition to the conjugated diene-based constituent unit (conjugated diene unit) and the group represented by Formula (I), a constituent unit based on another monomer. Examples of said other monomer include an aromatic vinyl, a vinylnitrile, and an unsaturated carboxylic acid ester. Examples of the aromatic vinyl include styrene, α-methylstyrene, vinyltoluene, vinylnaphthalene, divinylbenzene, trivinylbenzene, and divinylnaphthalene. Examples of the vinylnitrile include acrylonitrile, and examples of the unsaturated carboxylic acid ester include methyl acrylate, ethyl acrylate, methyl methacrylate, and ethyl methacrylate. Among them, an aromatic vinyl is preferable, and styrene is more preferable.

From the viewpoint of strength the conjugated diene polymer preferably comprises an aromatic vinyl-based constituent unit (aromatic vinyl unit), and the content of the aromatic vinyl unit, relative to 100% by weight of the total amount of the conjugated diene unit and the aromatic vinyl unit, is preferably not less than 10% by weight (the content of the conjugated diene unit being not more than 90% by weight), and more preferably not less than 15% by weight (the content of the conjugated diene unit being not more than 85% by weight). Furthermore, from the viewpoint of fuel economy, the content of the aromatic vinyl unit is preferably not more than 50% by weight (the content of the conjugated diene unit being not less than 50% by weight), and more preferably not more than 45% by weight (the content of the conjugated diene unit being not less than 55% by weight).

From the viewpoint of strength, the conjugated diene polymer has a Mooney viscosity $ML_{1+4}$ of preferably not less than 10, and more preferably not less than 20. From the viewpoint of processability, the conjugated diene polymer has a Mooney viscosity $ML_{1+4}$ of preferably not more than 200, and more preferably not more than 150. The Mooney viscosity $ML_{1+4}$ is measured at 100° C. in accordance with JIS K6300 (1994).

From the viewpoint of fuel economy, abrasion resistance, and strength being enhanced, the conjugated diene polymer has a vinyl bond content of preferably not more than 80 mol %, and more preferably not more than 70 mol % related to 100 mol % of the conjugated diene unit. From the viewpoint of grip properties, the conjugated diene polymer has a vinyl bond content of preferably not less than 10 mol %, more preferably not less than 15 mol %, yet more preferably not less than 20 mol %, and particularly preferably not less than 40 mol %. The vinyl bond content may be determined by IR spectroscopy from the absorption intensity at around 910 $cm^{-1}$, which is an absorption peak of a vinyl group.

From the viewpoint of fuel economy, the conjugated diene polymer has a molecular weight distribution of preferably 1 to 5, and more preferably 1 to 2. The molecular weight distribution is obtained by measuring number-average molecular weight (Mn) and weight-average molecular weight (Mw) by gel permeation chromatography (GPC), and dividing Mw by Mn.

The conjugated diene polymer may be produced by putting a group represented by Formula (I) on at least two termini of a polymer chain using a method for introducing a group represented by Formula (I) into a terminal of a polymer chain such as (1) a method in which polymerization of a monomer comprising a conjugated diene is carried out after a polymerization initiator and a silicon compound represented by Formula (III), which is described later, are reacted, or (2) a method in which a silicon compound represented by Formula (III) is reacted with termini of a polymer prepared by polymerization of a monomer comprising a conjugated diene.

Preferred examples of the process for producing the conjugated diene polymer of the present invention include a production process comprising the steps of A, B, and C.

(Step A) contacting an organoalkali metal compound catalyst having 2 to 20 carbons and a silicon compound represented by Formula (III) in a hydrocarbon solvent to prepare a reaction product of the organoalkali metal compound catalyst and the silicon compound;

(Step B) polymerizing a monomer comprising a conjugated diene by contacting the monomer with the reaction product prepared in Step A and the monomer comprising a conjugated diene in a hydrocarbon solvent to prepare a polymer having at a polymer chain terminal an alkali metal originating from the organoalkali metal compound catalyst; and (Step C) reacting a silicon compound represented by Formula (III) with a polymer chain terminal, of the polymer prepared in Step B, having the alkali metal originating from the organoalkali metal compound catalyst by contacting the silicon compound represented by Formula (III) with the polymer in a hydrocarbon solvent

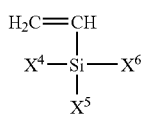

(III)

wherein $X^4$, $X^5$, and $X^6$ independently denote a group represented by Formula (II), a hydrocarbyl group, or a substituted hydrocarbyl group, and at least one selected from among $X^4$, $X^5$, and $X^6$ is a group represented by Formula (II),

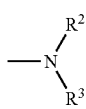

(II)

wherein $R^2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure.

Examples of the organoalkali metal compound catalyst having 2 to 20 carbons used in Step A include ethyllithium, n-propyllithium, iso-propyllithium, n-butyllithium, sec-butyllithium, t-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, and lithium dodecamethyleneimide. Among them, an organolithium compound is preferable.

With regard to the silicon compound represented by Formula (III) used in Step A and Step C, $X^4$, $X^5$, and $X^6$ in Formula (III) independently denote a group represented by Formula (II), a hydrocarbyl group, or a substituted hydrocarbyl group, and at least one selected from among $X^4$, $X^5$, and $X^6$ is a group represented by Formula (II).

In the silicon compound represented by Formula (III), examples of $R^2$ and $R^3$ in Formula (II) and preferred groups, and examples of Formula (II) and preferred groups are the same as examples of $R^2$ and $R^3$ in Formula (II) and preferred groups, and examples of Formula (II) and preferred groups described above for Formula (I).

Examples of the hydrocarbyl group denoted by $X^4$, $X^5$ and $X^6$ in Formula (III) include alkyl groups such as a methyl group, an ethyl group, an n-propyl group, an isopropyl group, an n-butyl group, a sec-butyl group, and a tert-butyl group. Furthermore, examples of the substituted hydrocarbyl group include alkoxyalkyl groups such as a methoxymethyl group, an ethoxymethyl group, a methoxyethyl group, and an ethoxyethyl group. The hydrocarbyl group is preferably an alkyl group, and the substituted hydrocarbyl group is preferably an alkoxyalkyl group.

The hydrocarbyl group and substituted hydrocarbyl group denoted by $X^4$, $X^5$ and $X^6$ are preferably a hydrocarbyl group having 1 to 4 carbons or a substituted hydrocarbyl group having 1 to 4 carbons, and more preferably a methyl group or an ethyl group.

With regard to the silicon compound represented by Formula (III), examples of a compound in which one selected from among $X^4$, $X^5$ and $X^6$ is an acyclic amino group represented by Formula (II) and two other substituents are a hydrocarbyl group or a substituted hydrocarbyl group include a (dialkylamino)dialkylvinylsilane, a {di(trialkylsilyl)amino}dialkylvinylsilane, and a (dialkylamino)dialkoxyalkylvinylsilane.

Examples thereof include (dimethylamino)dimethylvinylsilane, (ethylmethylamino)dimethylvinylsilane, (diethylamino)dimethylvinylsilane, (ethyl-n-propylamino)dimethylvinylsilane, (ethylisopropylamino)dimethylvinylsilane, (di-n-propylamino)dimethylvinylsilane, (diisopropylamino)dimethylvinylsilane, (n-butyl-n-propylamino)dimethylvinylsilane, (di-n-butylamino)dimethylvinylsilane, (dimethylamino)diethylvinylsilane, (ethylmethylamino)diethylvinylsilane, (diethylamino)diethylvinylsilane, (ethyl-n-propylamino)diethylvinylsilane, (ethylisopropylamino)diethylvinylsilane, (di-n-propylamino)diethylvinylsilane, (diisopropylamino)diethylvinylsilane, (n-butyl-n-propylamino)diethylvinylsilane, (di-n-butylamino)diethylvinylsilane, (dimethylamino)dipropylvinylsilane, (ethylmethylamino)dipropylvinylsilane, (diethylamino)dipropylvinylsilane, (ethyl-n-propylamino)dipropylvinylsilane, (ethylisopropylamino)dipropylvinylsilane, (di-n-propylamino)dipropylvinylsilane, (diisopropylamino)dipropylvinylsilane, (n-butyl-n-propylamino)dipropylvinylsilane, (di-n-butylamino)dipropylvinylsilane, (dimethylamino)dibutylvinylsilane, (ethylmethylamino)dibutylvinylsilane, (diethylamino)dibutylvinylsilane, (ethyl-n-propylamino)dibutylvinylsilane, (ethylisopropylamino)dibutylvinylsilane, (di-n-propylamino)dibutylvinylsilane, (diisopropylamino)dibutylvinylsilane, (n-butyl-n-propylamino)dibutylvinylsilane, (di-n-butylamino)dibutylvinylsilane, {di(trimethylsilyl)amino}dimethylvinylsilane, {di(t-butyldimethylsilyl)amino}dimethylvinylsilane, {di(trimethylsilyl)amino}diethylvinylsilane, {di(t-butyldimethylsilyl)amino}diethylvinylsilane, (dimethylamino)dimethoxymethylvinylsilane, (dimethylamino)dimethoxyethylvinylsilane, (dimethylamino)diethoxymethylvinylsilane, (dimethylamino)diethoxyethylvinylsilane, (diethylamino)dimethoxymethylvinylsilane, (diethylamino)dimethoxyethylvinylsilane, (diethylamino)diethoxymethylvinylsilane, and (diethylamino)diethoxyethylvinylsilane.

Examples of a compound in which two selected from among $X^4$, $X^5$ and $X^6$ are acyclic amino groups represented by Formula (II) and one other substituent is a hydrocarbyl group or a substituted hydrocarbyl group include a bis(dialkylamino)alkylvinylsilane, a bis{di(trialkylsilyl)amino}alkylvinylsilane, and a bis(dialkylamino)alkoxyalkylvinylsilane.

Examples thereof include bis(dimethylamino)methylvinylsilane, bis(ethylmethylamino)methylvinylsilane, bis(diethylamino)methylvinylsilane, bis(ethyl-n-propylamino)methylvinylsilane, bis(ethylisopropylamino)methylvinylsilane, bis(di-n-propylamino)methylvinylsilane, bis(diisopropylamino)methylvinylsilane, bis(n-butyl-n-propylamino)methylvinylsilane, bis(di-n-butylamino)methylvinylsilane, bis(dimethylamino)ethylvinylsilane, bis(ethylmethylamino)ethylvinylsilane, bis(diethylamino)ethylvinylsilane, bis(ethyl-n-propylamino)ethylvinylsilane, bis(ethylisopropylamino)ethylvinylsilane, bis(di-n-propylamino)ethylvinylsilane, bis(diisopropylamino)ethylvinylsilane, bis(n-butyl-n-propylamino)ethylvinylsilane, bis(di-n-butylamino)ethylvinylsilane, bis(dimethylamino)

propylvinylsilane, bis(ethylmethylamino)propylvinylsilane, bis(diethylamino)propylvinylsilane, bis(ethyl-n-propylamino)propylvinylsilane, bis(ethylisopropylamino)propylvinylsilane, bis(di-n-propylamino)propylvinylsilane, bis(diisopropylamino)propylvinylsilane, bis(n-butyl-n-propylamino)propylvinylsilane, bis(di-n-butylamino)propylvinylsilane, bis(dimethylamino)butylvinylsilane, bis(ethylmethylamino)butylvinylsilane, bis(diethylamino)butylvinylsilane, bis(ethyl-n-propylamino)butylvinylsilane, bis(ethylisopropylamino)butylvinylsilane, bis(di-n-propylamino)butylvinylsilane, bis(diisopropylamino)butylvinylsilane, bis(n-butyl-n-propylamino)butylvinylsilane, bis(di-n-butylamino)butylvinylsilane, bis{di(trimethylsilyl)amino}methylvinylsilane, bis{di(t-butyldimethylsilyl)amino}methylvinylsilane, bis{di(trimethylsilyl)amino}ethylvinylsilane, bis{di(t-butyldimethylsilyl)amino}ethylvinylsilane, bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(diethylamino)ethoxyethylvinylsilane.

Examples of a compound in which $X^4$, $X^5$, and $X^6$ are acyclic amino groups represented by Formula (II) include a tri(dialkylamino)vinylsilane.

Examples thereof include tri(dimethylamino)vinylsilane, tri(ethylmethylamino)vinylsilane, tri(diethylamino)vinylsilane, tri(ethylpropylamino)vinylsilane, tri(dipropylamino)vinylsilane, and tri(butylpropylamino)vinylsilane.

With regard to the silicon compound represented by Formula (III), examples of a compound in which at least one selected from among $X^4$, $X^5$, and $X^6$ is a cyclic amino group represented by Formula (II) include bis(morpholino)methylvinylsilane, bis(piperidino)methylvinylsilane, bis(4,5-dihydroimidazolyl)methylvinylsilane, and bis(hexamethyleneimino)methylvinylsilane.

At least one selected from among $X^4$, $X^5$, and $X^6$ in Formula (III) is a group represented by Formula (II). It is preferable that at least two selected from among $X^4$, $X^5$, and $X^6$ are represented by Formula (II), and it is more preferable that two selected from among $X^4$, $X^5$, and $X^6$ are represented by Formula (II).

The silicon compound represented by Formula (III) in which two selected from among $X^4$, $X^5$, and $X^6$ are represented by Formula (II) is preferably a silicon compound in which two selected from among $X^4$, $X^5$, and $X^6$ are an acyclic amino group; from the viewpoint of fuel economy it is more preferably a bis(dialkylamino)alkylvinylsilane, and yet more preferably bis(dimethylamino)methylvinylsilane, bis(diethylamino)methylvinylsilane, bis(di-n-propylamino)methylvinylsilane, or bis(di-n-butylamino)methylvinylsilane. Among them, from the viewpoint of ready availability of the compound, bis(diethylamino)methylvinylsilane or bis(di-n-butylamino)methylvinylsilane is preferable.

The hydrocarbon solvent used in Step A, Step B, and Step C is a solvent that does not deactivate the organoalkali metal compound catalyst, and examples thereof include an aliphatic hydrocarbon, an aromatic hydrocarbon, and an alicyclic hydrocarbon. Specific examples of the aliphatic hydrocarbon include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. Specific examples of the aromatic hydrocarbon include benzene, toluene, xylene, and ethylbenzene, and specific examples of the alicyclic hydrocarbon include cyclopentane and cyclohexane. Each of these solvents may be used alone or in combination with another or more. Among them, a hydrocarbon having 2 to 12 carbons is preferable.

The molar ratio of the organoalkali metal compound catalyst having 2 to 20 carbons and the silicon compound represented by Formula (III) when contacting the organoalkali metal compound catalyst having 2 to 20 carbons and the silicon compound represented by Formula (III) in Step A is usually 1/0.6 to 1/3 as the number of moles of the organoalkali metal compound catalyst having 2 to 20 carbons/the number of moles of the silicon compound represented by Formula (III), from the viewpoint of economy is preferably 1/0.8 to 1/2, and is more preferably 1/1 to 1/1.5.

The temperature when contacting the organoalkali metal compound catalyst having 2 to 20 carbons and the silicon compound represented by Formula (III) in Step A is usually 0° C. to 60° C., and preferably 20° C. to 40° C. The contact time is usually 60 sec to 48 hours, and preferably 10 minutes to 2 hours.

Examples of the conjugated diene used in Step B include 1,3-butadiene, isoprene, 1,3-pentadiene, 2,3-dimethyl-1,3-butadiene, and 1,3-hexadiene. Among them, from the viewpoint of ready availability, 1,3-butadiene and isoprene are preferable. Each of these may be used alone or in combination with another or more.

In Step B, the conjugated diene may be polymerized, or a mixture of the conjugated diene and other monomer may be polymerized. Examples of said other monomer include an aromatic vinyl, a vinylnitrile, and an unsaturated carboxylic acid ester. Specific examples of the aromatic vinyl include styrene, α-methylstyrene, vinyltoluene, vinynaphthalene, divinylbenzene, trivinylbenzene, and divinylnaphthalene. Specific examples of the vinylnitrile include acrylonitrile, and specific examples of the unsaturated carboxylic acid ester include methyl acrylate, ethyl acrylate, methyl methacrylate, and ethyl methacrylate. Among them, an aromatic vinyl is preferable, and styrene is more preferable.

The polymerization in Step B may be carried out in the presence of an agent for regulating the vinyl bond content of the conjugated diene unit, an agent for regulating the distribution in the conjugated diene polymer chain of the conjugated diene unit and a constituent unit based on a monomer other than the conjugated diene (hereafter, generally called 'regulators'), etc. Examples of such agents include an ether compound, a tertiary amine, and a phosphine compound. Specific examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Specific examples of the tertiary amine include triethylamine, tripropylamine, tributylamine, N,N,N',N'-tetramethylethylenediamine, N,N-diethylaniline, pyridine, and quinoline. Specific examples of the phosphine compound include trimethylphosphine, triethylphosphine, and triphenylphosphine. Each of these may be used alone or in combination with another or more.

The polymerization temperature in Step B is usually 25° C. to 100° C., preferably 35° C. to 90° C., and yet more preferably 50° C. to 80° C. The polymerization time is usually 10 minutes to 5 hours.

In Step C, the amount of silicon compound represented by Formula (III) that is contacted with the polymer prepared in Step B is usually 0.6 to 3 mol per mol of the alkali metal originating from the organoalkali metal compound catalyst, preferably 0.8 to 2 mol, and more preferably 1 to 1.5 mol.

In Step C, the temperature at which the polymer prepared in Step B and the silicon compound represented by Formula (III) are contacted is usually 25° C. to 100° C., preferably 35° C. to 90° C., and yet more preferably 50° C. to 80° C. The contact time is usually 60 sec to 5 hours, and preferably 15 min to 1 hour.

The production process may further comprise Step D.
(Step D) contacting the polymer prepared in Step C and a coupling agent represented by Formula (IV) in a hydrocarbon solvent.

$$R^4{}_a ML_{4-a} \quad (IV)$$

In the formula, $R^4$ denotes an alkyl group, an alkenyl group, a cycloalkenyl group, or an aromatic residue, M denotes a silicon atom or a tin atom, L denotes a halogen atom or a hydrocarbyloxy group, and a denotes an integer of 0 to 2.

The aromatic residue denotes a monovalent group in which a hydrogen bonded to an aromatic ring is removed from an aromatic hydrocarbon, and the hydrocarbyloxy group denotes a monovalent group in which a hydrocarbyl group is bonded to oxy (—O—).

In Step D, from the viewpoint of the kneading processability of the conjugated diene polymer, the amount of coupling agent represented by Formula (IV) that is contacted with the polymer prepared in Step C is preferably not less than 0.03 mol per mol of the organoalkali metal compound catalyst, and more preferably not less than 0.05 mol. From the viewpoint of fuel economy, breaking strength, and abrasion resistance, it is preferably not more than 0.4 mol, and more preferably not more than 0.3 mol.

In Step D, the temperature at which the polymer prepared in Step C and the coupling agent represented by Formula (IV) are contacted is usually 30° C. to 100° C., and preferably 50° C. to 80° C. The contact time is usually 60 sec to 5 hours, and preferably 15 min to 1 hour.

Examples of the coupling agent represented by Formula (IV) include silicon tetrachloride, methyltrichlorosilane, dimethyidichlorosilane, trimethylchlorosilane, tin tetrachloride, methyltrichlorotin, dimethyidichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

Furthermore, examples of the process for producing a conjugated diene polymer include a production process comprising Step A, Step B, and the step of contacting the polymer prepared in Step B with a coupling agent represented by Formula (IV) in a hydrocarbon solvent.

The conjugated diene polymer may be recovered from the hydrocarbon solution of the conjugated diene polymer by a conventional recovery method, for example, (1) a method in which a coagulant is added to the hydrocarbon solution of the conjugated diene polymer or (2) a method in which steam is added to the hydrocarbon solution of the conjugated diene polymer. The conjugated diene polymer thus recovered may be dried by a conventional dryer such as a band dryer or an extrusion dryer.

Furthermore, in the process for producing a conjugated diene polymer, a treatment in which a group, represented by Formula (II), of a polymer is substituted by a hydroxy group by hydrolysis may be carried out. This treatment may be carried out in a state in which the polymer is on its own or is in a compositional state, as described later.

The conjugated diene polymer may be used in a conjugated diene polymer composition by mixing another polymer component, an additive, etc. therewith.

Examples of said other polymer component include conventional styrene-butadiene copolymer rubber, polybutadiene rubber, butadiene-isoprene copolymer rubber, and butyl rubber. Examples further include natural rubber, an ethylene-propylene copolymer, and an ethylene-octene copolymer. Each of these components may be used alone or in combination with another or more.

When another polymer component is mixed with the conjugated diene polymer, from the viewpoint of fuel economy, the amount of conjugated diene polymer is preferably not less than 10 parts by weight, and more preferably not less than 20 parts by weight related to 100 parts by weight of the total amount of polymer components (including the amount of conjugated diene polymer).

As the additive, a conventional additive may be used, and examples thereof include a vulcanizing agent such as sulfur; a vulcanization accelerator such as a thiazole-based vulcanization accelerator, a thiuram-based vulcanization accelerator, a sulfenamide-based vulcanization accelerator, or a guanidine-based vulcanization accelerator; a vulcanization activator such as stearic acid or zinc oxide; an organic peroxide; a filler such as silica, carbon black, calcium carbonate, talc, alumina, clay, aluminum hydroxide, or mica; a silane coupling agent; an extender oil; a processing aid; an antioxidant; and a lubricant.

Examples of the silica include fumed silica (anhydrous silicic acid), precipitated silica (hydrated silicic acid), colloidal silica, calcium silicate, and aluminum silicate. Each of these may be used alone or in combination with another or more. The silica has a BET specific surface area of usually 50 to 250 m$^2$/g. The BET specific surface area is measured in accordance with ASTM D1993-03. A commercial product, for example, trade names VN3, AQ, ER, and RS-150 manufactured by Tosoh Silica Corporation, trade names Zeosil 1115MP and 1165MP manufactured by Rhodia, is available.

Examples of the carbon black include furnace black, acetylene black, thermal black, channel black, and graphite. Specific examples of the carbon black include channel carbon black such as EPC, MPC, or CC; furnace carbon black such as SAF, ISAF, HAF, MAF, FEF, SRF, GPF, APF, FF, CF, SCF, or ECF; thermal carbon black such as FT or MT; and acetylene carbon black. Each of these may be used alone or in combination with another or more.

The carbon black ahs a nitrogen adsorption specific surface area ($N_2SA$) of usually 5 to 200 m$^2$/g, and a dibutyl phthalate (DBP) absorption of usually 5 to 300 mL/100 g. The nitrogen adsorption specific surface area is measured in accordance with ASTM D4820-93, and the DBP absorption is measured in accordance with ASTM D2414-93. A commercial product, for example, trade names SEAST 6, SEAST 7HM, and SEAST KH manufactured by Tokai Carbon Co., Ltd., trade names CK 3 and Special Black 4A manufactured by Degussa, Inc., is available.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. Each of these may be used alone or in combination with another or more. A commercial product, for example, trade names Si69 and Si75 manufactured by Degussa, Inc., etc. is available.

Examples of the extender oil include an aromatic mineral oil (viscosity-gravity constant (V.G.C. value) 0.900 to 1.049), a naphthenic mineral oil (V.G.C. value 0.850 to 0.899), and a paraffinic mineral oil (V.G.C. value 0.790 to 0.849). The extender oil has a polycyclic aromatic content of preferably less than 3% by weight, and more preferably less than 1% by weight. The polycyclic aromatic content is measured in accordance with British Institute of Petroleum method 346/92. The extender oil has an aromatic compound content (CA) of preferably not less than 20% by weight. Each of these oils may be used alone or in combination with another or more.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based crosslinking promoters such as tetramethylthiuram monosulfide and tetramethylthiuram disulfide; sulfenamide-based crosslinking promoters such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine and orthotolylbiguanidine. The amount thereof used is preferably 0.1 to 5 parts by weight relative to 100 parts by weight of rubber component, and more preferably 0.2 to 3 parts by weight.

When a filler is mixed with the conjugated diene polymer to obtain a conjugated diene polymer composition, the amount of the filler is usually 10 to 150 parts by weight relative to 100 parts by weight of the conjugated diene polymer. From the viewpoint of abrasion resistance and strength, the amount is preferably not less than 20 parts by weight, and more preferably not less than 30 parts by weight. From the viewpoint of reinforcement being enhanced, it is preferably not more than 120 parts by weight, and more preferably not more than 100 parts by weight.

When a conjugated diene polymer composition containing the filler and the conjugated diene polymer is used, from the viewpoint of fuel economy, it is preferable to use silica as a filler. The amount of silica is preferably not less than 50 parts by weight relative to 100 parts by weight of the total amount of fillers, and more preferably not less than 70 parts by weight.

In a process for producing a conjugated diene polymer composition containing another polymer component, an additive, etc. in addition to the conjugated diene polymer, a conventional method, for example, a method in which the components are kneaded by means of a conventional mixer such as a roll mixer and Banbury mixer can be used.

With regard to kneading conditions, when an additive other than a vulcanizing agent or a vulcanization accelerator is mixed, the kneading temperature is usually 50° C. to 200° C. and preferably 80° C. to 190° C., and the kneading time is usually 30 sec to 30 min and preferably 1 min to 30 min. When a vulcanizing agent or a vulcanization accelerator is mixed, the kneading temperature is usually not more than 100° C., and preferably room temperature to 80° C. A composition in which a vulcanizing agent or a vulcanization accelerator is mixed is usually used after carrying out a vulcanization treatment such as press vulcanization. The vulcanization temperature is usually 120° C. to 200° C., and preferably 140° C. to 180° C.

The conjugated diene polymer and the conjugated diene polymer composition have excellent fuel economy and abrasion resistance. The strength is also good.

The conjugated diene polymer and the conjugated diene polymer composition are used for tires, shoe soles, flooring materials, vibration-proofing materials, etc., and are particularly suitably used for tires.

In accordance with the present invention, there can be provided a conjugated diene polymer that can give a polymer composition having excellent fuel economy and abrasion resistance when mixed with silica as a filler, a polymer composition formed by mixing the conjugated diene polymer and a filler such as silica, and a process for producing the conjugated diene polymer. The polymer composition has excellent fuel economy and abrasion resistance and has good strength.

EXAMPLES

The present invention is explained below by reference to Examples.

Properties were evaluated by the following methods.
1. Mooney Viscosity ($ML_{1+4}$)

The Mooney viscosity of a polymer was measured at 100° C. in accordance with JIS K6300 (1994).

2. Vinyl Content (Units: mol %)

The vinyl content of a polymer was determined by IR spectroscopy from the absorption intensity at around 910 $cm^{-1}$, which is an absorption peak of a vinyl group.

3. Styrene Unit Content (Units: % by Weight)

The styrene unit content of a polymer was determined from refractive index in accordance with JIS K6383 (1995).

4. Molecular Weight Distribution (Mw/Mn)

Weight-average molecular weight (Mw) and number-average molecular weight (Mn) were measured under conditions (1) to (8) below by a gel permeation chromatograph (GPC) method, and the molecular weight distribution (Mw/Mn) of a polymer was determined.

(1) Instrument: HLC-8020 manufactured by Tosoh Corporation
(2) Separation column: GMH-XL (2 columns in tandem) manufactured by Tosoh Corporation
(3) Measurement temperature: 40° C.
(4) Carrier: tetrahydrofuran
(5) Flow rate: 0.6 mL/min
(6) Amount injected: 5 μL
(7) Detector: differential refractometer
(8) Molecular weight standard: standard polystyrene 5. Fuel Economy A strip-shaped test piece having a width of 1 or 2 mm and a length of 40 mm was stamped out from a sheet-shaped vulcanized molding and used for testing. The loss tangent, tan δ (70° C.), at 70° C. of a test piece was measured using a viscoelastometer (Ueshima Seisakusho Co., Ltd.) under conditions of a strain of 1% and a frequency of 10 Hz. The smaller this value, the better the fuel economy.

6. Abrasion Resistance (Units: mg/1000 Rotations)

A ring-shaped vulcanized molding was used as a test piece, amounts abraded were measured using an Akron abrasion tester (Ueshima Seisakusho Co., Ltd.) under conditions of a load of 10 pounds and a test piece rotational speed of 300 rpm for 500 to 1500 rotations, 1500 to 2500 rotations, and 2500 to 3500 rotations, and the average value thereof was calculated. The smaller this value, the better the abrasion resistance.

7. Strength (TB, Units: MPa)

A dumbbell-shaped test piece (JIS K6251 No. 3) was stamped out from a sheet-shaped vulcanized molding, and used for testing. Stress at break when the test piece was pulled at a tensile speed of 500 mm/min using a tensile tester was measured.

Example 1

A 200 mL recovery flask was flushed with dry nitrogen, and charged with a solution of 11.0 mmol of Molecular Sieves (3A)-dried bis(diethylamino)methylvinylsilane in 10 mL of cyclohexane. Subsequently, an n-hexane solution of 11.0 mmol of n-butyllithium was charged into the recovery flask, and the bis(diethylamino)methylvinylsilane and n-butyllithium were reacted for 1.5 hours while stirring, thus giving a bis(diethylamino)methylvinylsilane and n-butyllithium reaction liquid.

A 20 L capacity stainless polymerization reactor was washed, dried, flushed with dry nitrogen, and charged with 10.2 kg of hexane (specific gravity 0.68 g/cm$^3$), 547 g of 1,3-butadiene, 173 g of styrene, 6.1 mL of tetrahydrofuran, and 4.7 mL of ethylene glycol diethyl ether. Polymerization-inhibiting material within the reactor was neutralized with n-butyllithium, the bis(diethylamino)methylvinylsilane and n-butyllithium reaction liquid was then charged into the polymerization reactor, and copolymerization of 1,3-butadiene and styrene was carried out for 3 hours. During polymerization, the stirring speed was 130 rpm, the polymerization reactor internal temperature was 65° C., and the monomers were supplied continuously to the polymerization reactor.

After the polymerization had been carried out for the 3 hours, a solution of 11.0 mmol of Molecular Sieves (3A)-dried bis(diethylamino)methylvinylsilane dissolved in 10 mL of cyclohexane was quickly charged into the polymerization reactor under conditions of a stirring speed of 130 rpm and a polymerization reactor internal temperature of 65° C., and stirred for 0.5 hours.

Subsequently, 20 mL of a hexane solution containing 0.5 mL of methanol was charged into a flask, and the polymer solution was stirred for 5 minutes.

The amount of 1,3-butadiene supplied during the polymerization was 821 g, and the amount of styrene supplied was 259 g.

To the polymer solution were added 1.8 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 0.9 g of pentaerythrityl tetrakis (3-laurylthiopropionate) (trade name: Sumilizer TP-D, manufactured by Sumitomo Chemical Co., Ltd.). Subsequently, the polymer solution was evaporated at normal temperature for 24 hours, and further dried under vacuum at 55° C. for 12 hours, thus giving a polymer. The results of evaluation of the polymer were given in Table 1.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black, 47.6 parts by weight of an extender oil (trade name: X-140, manufactured by Kyodo Sekiyu), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a polymer composition.

Molding of the polymer composition thus obtained into a sheet shape having a length and width of 150 mm and a thickness of 2 mm and vulcanization were carried out by a press molding machine under conditions of a temperature of 160° C. and a time of 45 minutes, thus giving a sheet-shaped vulcanized molding. The sheet-shaped vulcanized molding thus obtained was evaluated in terms of fuel economy and strength. Furthermore, molding of the polymer composition thus obtained into a ring shape having a diameter of 63.5 mm, a thickness of 12.7 mm, and a central hole of 12.7 mm and vulcanization were carried out by a press molding machine under conditions of a temperature of 160° C. and a time of 45 minutes, thus giving a ring-shaped vulcanized molding. The ring-shaped vulcanized molding thus obtained was evaluated in terms of abrasion resistance. The results of evaluation of the vulcanized moldings were given in Table 1.

Comparative Example 1

A 5 L capacity stainless polymerization reactor was washed, dried, flushed with dry nitrogen, and then charged with 2.55 kg of hexane (specific gravity 0.68 g/cm$^3$), 137 g of 1,3-butadiene, 43 g of styrene, 1.5 mL of tetrahydrofuran, and 1.2 mL of ethylene glycol diethyl ether. Subsequently, an n-hexane solution of 3.6 mmol of n-butyllithium was charged thereinto, and copolymerization of 1,3-butadiene and styrene was carried out for 0.45 hours. During polymerization, the stirring speed was 130 rpm, the polymerization reactor internal temperature was 65° C., and the monomers were supplied continuously to the polymerization reactor.

After the polymerization had been carried out for the 0.45 hours, a solution of 2.8 mmol of Molecular Sieves (3A)-dried bis(diethylamino)methylvinylsilane dissolved in 10 mL of cyclohexane was quickly charged into the polymerization reactor under conditions of a stirring speed of 130 rpm and a polymerization reactor internal temperature of 65° C.

Copolymerization of 1,3-butadiene and styrene was then carried out for 2.05 hours by continuously supplying the monomers to the polymerization reactor. During polymerization, the stirring speed was 130 rpm, and the polymerization reactor internal temperature was 65° C.

After the polymerization had been carried out for the 2.05 hours, a solution of 2.8 mmol of Molecular Sieves (3A)-dried bis(diethylamino)methylvinylsilane dissolved in 10 mL of cyclohexane was quickly charged into the polymerization reactor under conditions of a stirring speed of 130 rpm and a polymerization reactor internal temperature of 65° C., and stirred for 0.5 hours.

Subsequently, 10 mL of a hexane solution containing 0.1 mL of methanol was charged into the polymerization reactor, and the polymer solution was stirred for 5 minutes.

The amount of 1,3-butadiene supplied during the entire polymerization was 205 g, and the amount of styrene supplied was 65 g.

To the polymer solution were added 1.8 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 0.9 g of pentaerythrityl tetrakis (3-laurylthiopropionate) (trade name: Sumilizer TP-D, manufactured by Sumitomo Chemical Co., Ltd.). Subsequently, the polymer solution was evaporated at normal temperature for 24 hours, and further dried under vacuum at 55°

C. for 12 hours, thus giving a polymer. The results of evaluation of the polymer were given in Table 1.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black, 47.6 parts by weight of an extender oil (trade name: X-140, manufactured by Kyodo Sekiyu), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a polymer composition.

Molding of the polymer composition thus obtained into a sheet shape having a length and width of 150 mm and a thickness of 2 mm and vulcanization were carried out by a press molding machine under conditions of a temperature of 160° C. and a time of 45 minutes, thus giving a sheet-shaped vulcanized molding. The sheet-shaped vulcanized molding thus obtained was evaluated in terms of fuel economy and strength. Furthermore, molding of the polymer composition thus obtained into a ring shape having a diameter of 63.5 mm, a thickness of 12.7 mm, and a central hole of 12.7 mm and vulcanization were carried out by a press molding machine under conditions of a temperature of 160° C. and a time of 45 minutes, thus giving a ring-shaped vulcanized molding. The ring-shaped vulcanized molding thus obtained was evaluated in terms of abrasion resistance. The results of evaluation of the vulcanized moldings were given in Table 1.

Comparative Example 2

A 5 L capacity stainless polymerization reactor was washed, dried, flushed with dry nitrogen, and charged with 2.55 kg of hexane (specific gravity 0.68 g/cm³), 137 g of 1,3-butadiene, 43 g of styrene, 1.5 mL of tetrahydrofuran, and 1.2 mL of ethylene glycol diethyl ether. Subsequently, an n-hexane solution of 3.6 mmol of n-butyllithium was charged thereinto, and copolymerization of 1,3-butadiene and styrene was carried out for 0.67 hours. During polymerization, the stirring speed was 130 rpm, the polymerization reactor internal temperature was 65° C., and the monomers were supplied continuously to the polymerization reactor.

After the polymerization had been carried out for the 0.67 hours, a solution of 2.8 mmol of Molecular Sieves (3A)-dried bis(diethylamino)methylvinylsilane dissolved in 10 mL of cyclohexane was quickly charged into the polymerization reactor under conditions of a stirring speed of 130 rpm and a polymerization reactor internal temperature of 65° C.

Copolymerization of 1,3-butadiene and styrene was then carried out for 0.58 hours by continuously supplying the monomers to the polymerization reactor. During polymerization, the stirring speed was 130 rpm, and the polymerization reactor internal temperature was 65° C.

After the polymerization had been carried out for the 0.58 hours, a solution of 2.8 mmol of Molecular Sieves (3A)-dried bis(diethylamino)methylvinylsilane dissolved in 10 mL of cyclohexane was quickly charged into the polymerization reactor under conditions of a stirring speed of 130 rpm and a polymerization reactor internal temperature of 65° C.

Copolymerization of 1,3-butadiene and styrene was then carried out for 1.25 hours by continuously supplying the monomers to the polymerization reactor. During polymerization, the stirring speed was 130 rpm, and the polymerization reactor internal temperature was 65° C.

After the polymerization had been carried out for the 1.25 hours, 10 mL of a hexane solution containing 0.1 mL of methanol was charged into the polymerization reactor, and the polymer solution was stirred for 5 minutes.

The amount of 1,3-butadiene supplied during the entire polymerization was 205 g, and the amount of styrene supplied was 65 g.

To the polymer solution were added 1.8 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 0.9 g of pentaerythrityl tetrakis (3-laurylthiopropionate) (trade name: Sumilizer TP-D, manufactured by Sumitomo Chemical Co., Ltd.). Subsequently, the polymer solution was evaporated at normal temperature for 24 hours, and further dried under vacuum at 55° C. for 12 hours, thus giving a polymer. The results of evaluation of the polymer were given in Table 1.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black, 47.6 parts by weight of an extender oil (trade name: X-140, manufactured by Kyodo Sekiyu), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a polymer composition.

Molding of the polymer composition thus obtained into a sheet shape having a length and width of 150 mm and a thickness of 2 mm and vulcanization were carried out by a press molding machine under conditions of a temperature of 160° C. and a time of 45 minutes, thus giving a sheet-shaped vulcanized molding. The sheet-shaped vulcanized molding thus obtained was evaluated in terms of fuel economy and strength. Furthermore, molding of the polymer composition obtained into a ring shape having a diameter of 63.5 mm, a thickness of 12.7 mm, and a central hole of 12.7 mm and vulcanization were carried out by a press molding machine under conditions of a temperature of 160° C. and a time of 45 minutes, thus giving a ring-shaped vulcanized molding. The ring-shaped vulcanized molding thus obtained was evaluated in terms of abrasion resistance. The results of evaluation of the vulcanized moldings were given in Table 1.

TABLE 1

|  |  | Ex. 1 | Comp. Ex. 1 | Comp. Ex. 2 |
|---|---|---|---|---|
| Mooney Viscosity | — | 51 | 41 | 36 |
| Vinyl content | % | 58 | 59 | 59 |
| Styrene unit content | % by weight | 25 | 24 | 24 |
| Molecular weight distribution | — | 1.29 | 1.18 | 1.08 |
| Fuel economy tanδ (70° C.) | — | 0.111 | 0.115 | 0.124 |

TABLE 1-continued

|  |  | Ex. 1 | Comp. Ex. 1 | Comp. Ex. 2 |
|---|---|---|---|---|
| Abrasion resistance Amount lost | mg/1000 rotations | 160 | 240 | 240 |
| Tensile physical properties TB | MPa | 19.8 | 17.8 | 17.4 |

The invention claimed is:

1. A conjugated diene polymer comprising:
a conjugated diene-based constituent unit; and
a group represented by Formula (I) at both termini of a polymer chain;

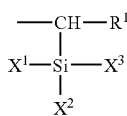
(I)

wherein $R^1$ denotes a hydrogen atom, a hydrocarbyl group having 1 to 20 carbons, or a substituted hydrocarbyl group having 1 to 20 carbons, $X^1$, $X^2$, and $X^3$ independently denote a group represented by Formula (II), a hydroxy group, a hydrocarbyl group, or a substituted hydrocarbyl group, and at least one selected from among $X^1$, $X^2$, and $X^3$ is a group represented by Formula (II) or a hydroxy group,

(II)

wherein $R^2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure.

2. The polymer according to claim 1, wherein $R^2$ and $R^3$ in Formula (II) independently denote a methyl group, an ethyl group, an n-propyl group, or an n-butyl group.

3. The polymer according to claim 1, wherein two groups selected from among $X^1$, $X^2$, and $X^3$ in Formula (I) are represented by Formula (II), or each of the two groups denotes a hydroxy group.

4. The polymer according to claim 1, wherein the conjugated diene polymer has a vinyl bond content of 20 to 70 mol % related to 100 mol % of the conjugated diene-based constituent unit.

5. The polymer according to claim 1, wherein the conjugated diene polymer has a molecular weight distribution of 1 to 2.

6. A conjugated diene polymer composition comprising the conjugated diene polymer according to claim 1, and a filler.

7. The composition according to claim 6, wherein the amount of filler is 10 to 150 parts by weight relative to 100 parts by weight of the conjugated diene polymer.

8. A process for producing a conjugated diene polymer, comprising the steps of A, B, and C:
(Step A) contacting an organoalkali metal compound catalyst having 2 to 20 carbons and a silicon compound represented by Formula (III) in a hydrocarbon solvent to prepare a reaction product of the organoalkali metal compound catalyst and the silicon compound;
(Step B) polymerizing a monomer comprising a conjugated diene by contacting the monomer with the reaction product prepared in Step A and the monomer comprising a conjugated diene in a hydrocarbon solvent to prepare a polymer having at a polymer chain terminal an alkali metal originating from the organoalkali metal compound catalyst; and
(Step C) reacting a silicon compound represented by Formula (III) with a polymer chain terminal, of the polymer prepared in Step B, having the alkali metal originating from the organoalkali metal compound catalyst by contacting the silicon compound represented by Formula (III) with the polymer in a hydrocarbon solvent

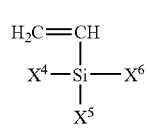
(III)

wherein $X^4$, $X^5$, and $X^6$ independently denote a group represented by Formula (II), a hydrocarbyl group, or a substituted hydrocarbyl group, and at least one selected from among $X^4$, $X^5$, and $X^6$ is a group represented by Formula (II),

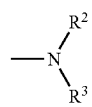
(II)

wherein $R^2$ and $R^3$ independently denote a hydrocarbyl group having 1 to 6 carbons, a substituted hydrocarbyl group having 1 to 6 carbons, a silyl group, or a substituted silyl group, and $R^2$ and $R^3$ may be bonded so as to form, together with the N atom, a ring structure.

9. The process according to claim 8, wherein $R^2$ and $R^3$ in Formula (II) independently denote a methyl group, an ethyl group, an n-propyl group, or an n-butyl group.

10. The process according to claim 8, wherein two groups selected from among $X^1$, $X^2$, and $X^3$ in Formula (III) are represented by Formula (II).

11. The process according to claim 8, wherein the conjugated diene polymer obtained has a vinyl bond content of 20 to 70 mol % related to 100 mol % of the conjugated diene-based constituent unit.

12. The process according to claim 8, wherein the conjugated diene polymer has a molecular weight distribution of 1 to 2.

13. A process for producing a conjugated diene polymer composition, comprising the step of mixing a filler and the polymer obtained by the process according to claim 8.

14. The process according to claim 13, wherein the conjugated diene polymer composition has a filler content of 10 to 150 parts by weight relative to 100 parts by weight of the polymer.

15. A vulcanizate obtained by vulcanizing the composition according to claim 6.

16. The process according to claim 13, further comprising the step of mixing a vulcanizing agent with the conjugated diene polymer composition.

17. A process for producing a vulcanizate, comprising the step of vulcanizing a conjugated diene polymer composition obtained by the process according to claim 16.

* * * * *